March 12, 1940.   A. P. DE SEVERSKY   2,193,449
AIRCRAFT PILOT'S SEAT
Filed July 18, 1935   2 Sheets-Sheet 1
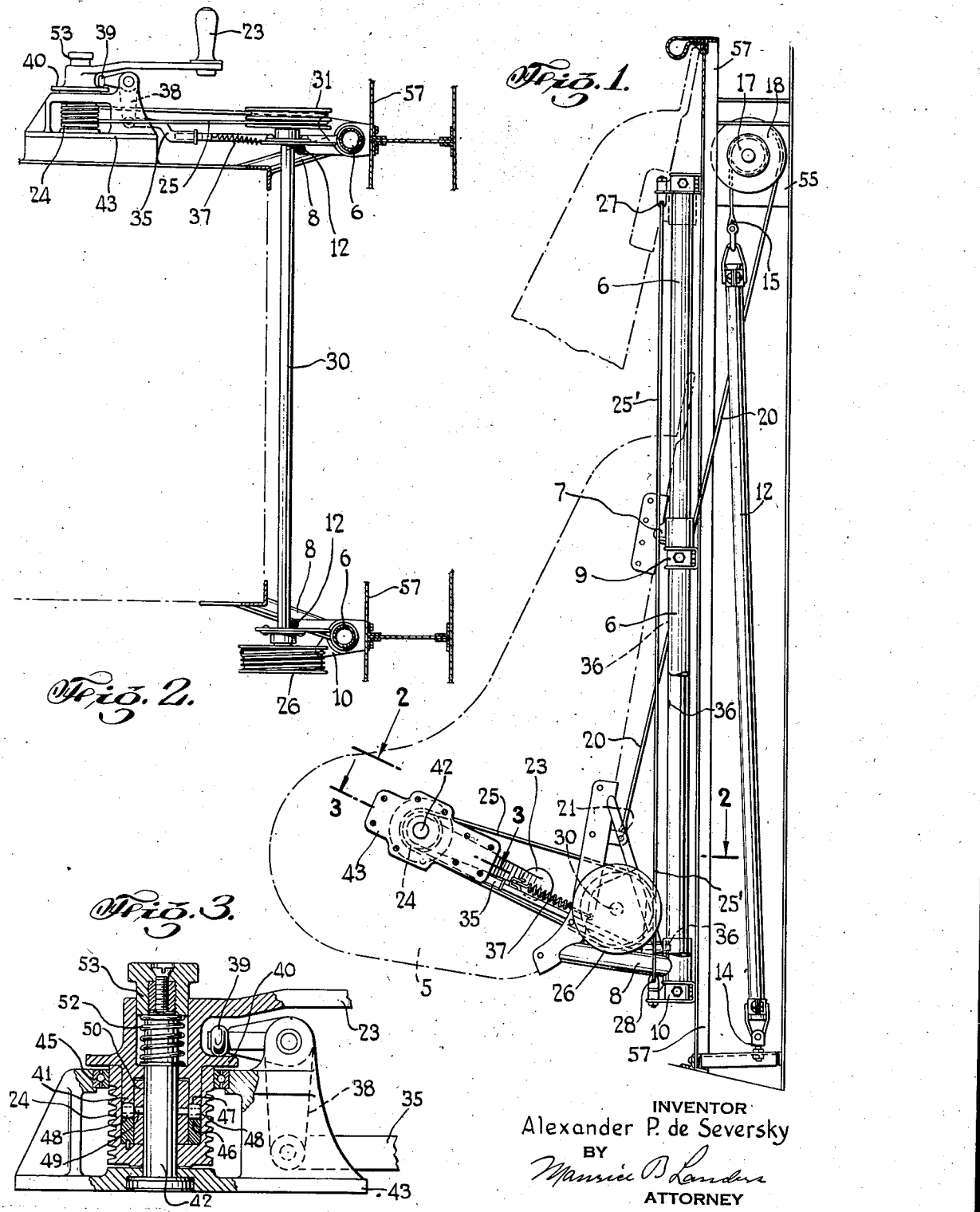
INVENTOR
Alexander P. de Seversky
BY
ATTORNEY

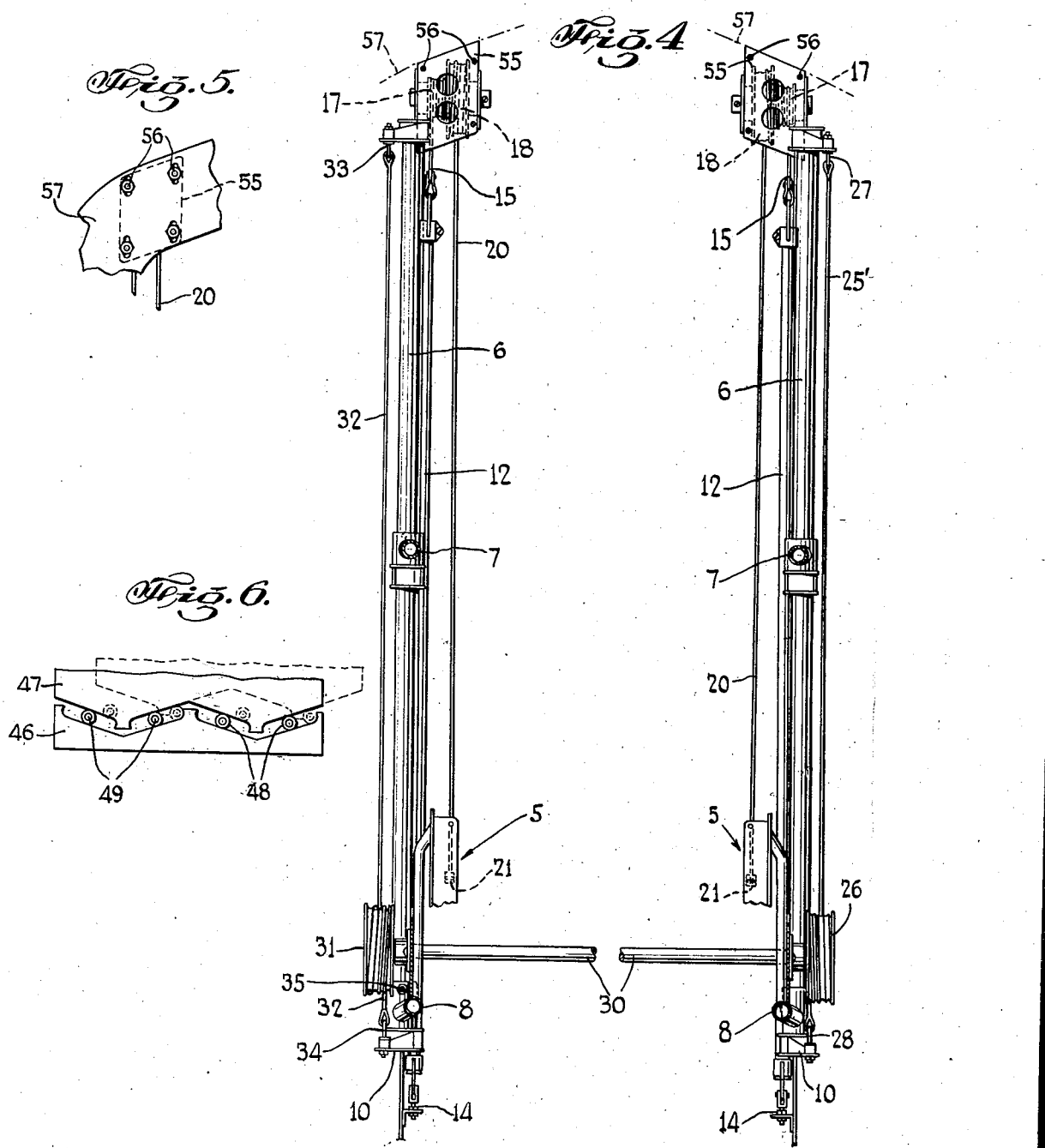

Patented Mar. 12, 1940

2,193,449

UNITED STATES PATENT OFFICE 2,193,449

AIRCRAFT PILOT'S SEAT

Alexander P. de Seversky, New York, N. Y., assignor to Seversky Aircraft Corporation, a corporation of Delaware Application July 18, 1935, Serial No. 32,024

8 Claims. (Cl. 155—5)

The present invention relates to aircraft and has for an object to provide an improved vertically movable seat.

When flying aircraft it is desirable for the pilot to be able to lower himself into the cockpit for flying blind and to draw the cover over the cockpit or to raise his seat and himself so that he may look out over the top of the cockpit when this is necessary for landing or at other times for obtaining a view of his surroundings. It is furthermore desirable that he should be able to raise and lower his seat without removing his feet from the controls.

The present invention provides an improved arrangement whereby with one hand the pilot can raise and lower the seat. The weight of the seat is counter-balanced in order that little power may be required for the raising and lowering operation and the counter-balancing means is made adjustable to accommodate pilots of different weight.

The nature and objects of the invention will be better understood from a description of an illustrative embodiment for the purpose of which description reference should be had to the accompanying drawings forming a part hereof and in which:

Figure 1 is a side view of a pilot's seat embodying the present invention,

Figure 2 is a horizontal sectional view taken on the line 2—2 of Figure 1,

Figure 3 is a detail sectional view of the operating mechanism taken on the line 3—3 of Figure 1, Figure 4 is a view in front elevation showing the arrangement of the guides and the counterbalancing mechanism, Figure 5 is a view in elevation of a vertically adjustable sheave carrying bracket, Figure 6 is a development view of the operating clutch.

The arrangement shown for the purposes of illustration comprises a seat 5 movable vertically on ways 6. The seat is carried by four upper and lower brackets 7 and 8 having sleeves slidably fitting the vertical guides and resting, in their lower-most position, on stops 9 and 10. The weight of the seat and the pilot therein is counter-balanced against the tension of a pair of rubber straps 12. The greater force of the rubber band when stretched is compensated to provide a substantially equal lift on the seat in all positions. As shown each rubber tension member 12 is secured to a fixed point 14 at its lower end and is connected at its upper end to a cable 15 which wraps around and is anchored in a spiral groove in the conical sheave 17, which sheave in turn is formed integral with a sheave 18 having a helical groove in which is wrapped a cable 20 which is anchored at one end in the groove and is connected at its free end to the seat as indicated at 21. By this arrangement the cable 15 engages the sheave 17 on a small diameter when the rubber strap is extended and therefore under relatively heavy tension, and it engages the sheave on a larger diameter when the strap is contracted and therefore under less tension. The cables 15 and 20 engage opposite sides of the unitary sheave structure 17, 18 as shown in Figure 1 and therefore pull against each other.

The pilot's seat is moved vertically on the ways 6 by an arrangement comprising a crank 23 and cables on opposite sides of the seat attached at their ends to the carrying frame. The crank 23 operates a sheave 24 having a helical groove which sheave in turn operates cable 25 wrapped at least twice around the sheave to provide adequate friction and from this sheave one run of the cable passes beneath and around one groove of the double sheave 31 and thence upward as a run or bight 32, substantially parallel to the guide 6 to a fixed point of attachment 33 at the top of the guide. The other run of the cable 25 passes over the other groove of the double sheave 31 and down to a fixed point of attachment 34 at its lower end. Operation of the crank 23 by driving the sheave 24 thus raises and lowers the seat as the cable 25 is pulled at one end and payed out at the other. This accomplishes a positive raising and lowering means for one side of the seat. In order to provide an equivalent operating force on the opposite side the double sheave 31 is rigidly secured to a transverse shaft 30, the opposite end of which carries the sheave 26 also rigidly secured on the shaft. The sheave 26 is formed with a helical groove and an operating cable 25' wrapped at least twice around this sheave extends upwardly to its fixed point of attachment 27 at the top of the guide 6 and downwardly to a fixed point of attachment 28 at the lower end of the guide.

A lock is provided for holding the seat positively in adjusted position. This lock is shown as consisting of a retractable pin 35 carried by the seat and positioned to engage any one of a series of holes 36 in one of the guides 6. This pin is arranged to be automatically retracted by the first turning movement of the crank 23 when raising or lowering the seat and again released for locking engagement when the crank is given a reverse movement at the end of the lifting or lowering operation. As shown the locking pin is urged to locking position by spring 37 and is retracted by a bell crank lever 38 carrying a roller 39 engaging a collar 40 formed on the hub of the crank 23.

As best shown in Figure 3, the sheave 24 and the hub 41 are coaxially and rotatably mounted on a stud shaft 42 rigidly secured in a bracket 43 carried on the side of the pilot's seat. The sheave is rotatably supported also by a ball bearing 45 in the bracket 43 to provide support at its outer end. The sheave 24 and the inner end of the hub sleeve 41 are formed with cooperating tapered jaws 46, 47 between which rollers 48 engage. The rollers are carried on pins 49 mounted in a floating sleeve 50 which is movable longitudinally on the shaft 42. A spring 52 compressed between a nut 53 and a shoulder on the sleeve 41 urges the crank and sleeve member 23, 41 inwardly. The shape of the jaws 46 and 47 is best shown in the development diagram of Figure 6. Upon movement of the crank 23 in either direction the jaws 47 move axially outward, and the roller 39 thus carried outwardly causes retraction of the locking pin 35 and immediately thereafter the sleeve 41 begins to rotate the sheave 24 to raise or lower the seat. At the end of the raising or lowering movement a reverse movement of the crank 23 permits the locking pin 35 to engage the corresponding hole in the guide 6. If the pin engages the guide between locking holes it will spring into locking position upon slight movement of the seat in either direction.

The friction between the seat carrying brackets 7 and 8 and the vertical support rods 6 is such as to require application of power to the crank 23 to positively move the same in order to avoid slipping when the crank 23 is operated to release the locking pin.

In order that the tension of the counter-balancing straps may be adjusted to correspond to the weight of the pilot the sheave structures 17, 18 are made vertically adjustable. As shown these sheaves are carried by brackets 55 which are adjustable vertically and are arranged to be clamped in adjusted position by clamp screws 56 secured on the vertical frame members 57.

The guides 6 are also carried on the vertical frame member 57 and the whole seat arrangement can be applied and removed as a unit.

The foregoing particular description is illustrative merely and is not intended as defining the limits of the invention.

I claim:

1. A vertically movable pilot's seat for aircraft comprising a vertical guide, a seat movable on said guide, means for counter-balancing the weight of the seat and its load comprising an elastic tensioning member, a tapered spiral sheave and a flexible member secured to the larger end of the tapered spiral sheave and wound around said spiral sheave and connected at its free end to said tensioning member, said flexible member being arranged to operate on the smaller end of the sheave when extended and on the larger end when relatively contracted, a second sheave operatively connected to the first sheave and a connection between said sheave and the seat to support the seat.

2. A vertically movable pilot's seat for aircraft comprising a vertical guide, a seat movable on said guide, means for counter-balancing the weight of the seat and its load, a lock for holding the seat in vertically adjusted position and means operable by the pilot automatically to first unlock and then move the seat vertically and after movement to again lock the seat in position.

3. A vertically movable pilot's seat for aircraft comprising a vertical guide, a seat movable on said guide, means for counter-balancing the weight of the seat and its load, a lock for securing the seat in adjusted position and means operable by the pilot on the seat for raising and lowering the seat, comprising a sheave, an operating crank mounted concentric with said sheave and connected thereto by a diagonal jaw clutch operative to move said crank laterally away from said sheave during the first part of its movement to rotate the sheave and a connection actuated by lateral movement of the crank to release the lock.

4. A vertically movable pilot's seat for aircraft comprising a vertical guide, a seat movable on said guide, means for counter-balancing the weight of the seat and its load, a lock for holding the seat in adjusted position and means operable by the pilot on the seat for raising and lowering the seat comprising a sheave, an operating crank mounted coaxially with said sheave and movable toward and from the same, said sheave and crank having diagonal cooperating elements operable upon turning of the crank in either direction to cause axial movement of the crank before causing rotative movement of the sheave and means operable by the axial movement of the crank for releasing the lock, substantially as described.

5. A vertically movable pilot's seat for aircraft comprising a vertical guide, a seat movable on said guide, means for counter-balancing the weight of the seat and its load, a lock for holding the seat in vertically adjusted position, a horizontal shaft extending transversely of the seat, a sheave on each end of said shaft, a cable looped around one sheave and secured to the guide toward the top and bottom thereof, a hand operated sheave, a cable looped around the hand operated sheave and extending over and under the double sheave and secured at its end to the guide above and below toward the upper and lower end thereof.

6. A vertically movable pilot seat for aircraft comprising a vertical guide, a seat movable on said guide, means for counterbalancing the weight of the seat and its load comprising a rubber band and means for compensating for variation of tension of the band to substantially counter-balance the weight of the pilot throughout the whole vertical movement, a lock for holding said seat in adjusted position and means operable by the pilot on the seat for raising and lowering the seat and its load comprising a shaft extending horizontally through said seat and mounted therein, a sheave carried at each end of said shaft, tension members wrapped around said sheaves respectively and secured at their free ends adjacent the upper and lower ends of said guide, a crank, and gearing operated thereby to rotate said transverse shaft to positively raise and lower said seat.

7. A vertically movable pilot's seat for aircraft comprising a frame including a stationary vertical guide, a seat slidable along said guide, means for counter-balancing the weight of the seat and its load, a lock cooperable with a fixed part of the frame for holding the seat in vertically adjusted position, a sheave mounted on said seat, a vertically-disposed cable encircling said sheave and having its ends anchored adjacent the upper and lower ends of the guide and a manually-operable crank for imparting rotation to the sheave to raise the seat.

8. A vertically movable pilot's seat for aircraft comprising a frame including a stationary vertical guide, a seat slidable along said guide, means for counter-balancing the weight of the seat and its load, a lock cooperable with a fixed part of the frame for holding the seat in vertically adjusted position, a pair of laterally-spaced sheaves mounted on said seat, a pair of vertically-disposed cables, each, encircling one of said sheaves and having its ends anchored respectively adjacent the upper and lower ends of the guide and a manually-operable crank for imparting rotation to said sheaves to raise the seat.

ALEXANDER P. DE SEVERSKY.